United States Patent [19]

Galazin

[11] Patent Number: 5,333,645

[45] Date of Patent: Aug. 2, 1994

[54] HEIGHT CONTROL VALVE AND DUMP VALVE THEREFOR

[75] Inventor: Gregory T. Galazin, Montague, Mich.

[73] Assignee: NAI Neway, Inc., Muskegon, Mich.

[21] Appl. No.: 72,714

[22] Filed: Jun. 7, 1993

[51] Int. Cl.$^5$ .............................................. B60G 11/26
[52] U.S. Cl. .................... 137/627.5; 91/448; 137/625.27; 280/714
[58] Field of Search .............. 91/390, 448; 137/627.5, 137/625.27; 280/714

[56] References Cited

U.S. PATENT DOCUMENTS

| | | | |
|---|---|---|---|
| 2,886,377 | 5/1959 | Martin | 137/625.27 |
| 2,908,291 | 10/1959 | Hunt | 91/448 X |
| 3,167,093 | 1/1965 | George | 137/625.27 |
| 4,886,092 | 12/1989 | Barzelay | |

Primary Examiner—Robert G. Nilson
Attorney, Agent, or Firm—Varnum, Riddering, Schmidt & Howlett

[57] ABSTRACT

A dump valve for selectively placing the inlet port of a height control valve into communication with a source of pressurized air or atmosphere. The dump valve comprises a body having a control bore, an opposing pilot bore, an exhaust bore intersecting the control bore, and a connection bore intersecting the control bore. The connecting bore has means for fluidly connecting the connection bore to the inlet bore of a height control valve. A valve seal disposed within the control bore for reciprocal movement therein selectively places the connection port in communication with either the supply port or the exhaust port. A piston axially disposed in the pilot bore for reciprocal movement therein controls the movement of the valve seal in response to the selective application of pressure to the pilot bore.

17 Claims, 6 Drawing Sheets

HEIGHT CONTROL VALVE AND DUMP VALVE THEREFOR

BACKGROUND OF THE INVENTION

1. Field of the Invention

The invention relates to height control valves in vehicle suspensions and, more particularly, to a height control valve with a novel dump valve. In another of its aspects, the invention relates to a dump valve for a height control valve.

2. State of the Prior Art

Air suspension systems have become increasingly popular for use in vehicle suspensions, seats, and cabs on semi-trailer truck rigs and other vehicles. Most typically employ a height control valve which maintains the design height of the suspension. In a semi-trailer suspension, for example, the design height is the spacing between the frame and the axle. The height control valve senses when the spacing is greater or less than its design value and, accordingly, adjusts the pressure in the air springs disposed between the frame and axle. The air suspension system with a height control valve maintains a uniform height of the air spring over a range of vehicle loading conditions.

The height control valve operates by selectively admitting air into, or exhausting air from, an air spring. The air spring is positioned between the truck frame and a trailing arm. The trailing arm carries the axle so that adjusting the air spring pressure also adjusts the distance between the truck frame and the axle. The height control valve typically mounts on the truck frame and has a control arm which connects to the trailing arm through a linkage. As the distance between the truck frame and trailing arm varies, the linkage causes the control arm to rotate a control shaft inside of the height control valve, which, in turn, selectively permits air to be admitted to or exhausted from the air spring.

Typically, the height control valve has three ports: an air spring port connected to the air spring, an inlet port connected to a source of pressurized air, and an exhaust port open to the atmosphere. To increase the height of the air spring, the height control valve opens fluid communication between the air spring port and the inlet port, allowing air to flow from the pressurized air source, through the height control valve and into the air spring. To decrease the height of the air spring, the height control valve opens fluid communication between the air spring port and the exhaust port, allowing air to flow out of the air spring through the height control valve, and to atmosphere through the exhaust port. When the air spring is at the proper height, the valve is in a neutral position wherein neither the inlet nor exhaust port communicates with the air spring.

Typically, dump valves are used on tractors and trailers equipped with air suspensions to exhaust air from the air springs and lower the vehicle chassis height. Common applications for dump valves on tractors would be to exhaust air from the tractor suspension before the tractor is connected or disconnected from a trailer. The operator typically lowers the front dolly legs on the trailer until they touch the ground. The gear mechanism on the dolly legs is manually operated and is thus easier to turn with no load on the legs. The air is then "dumped" or exhausted from the tractor air springs, lowering the tractor frame and thereby shifting the trailer weight to the dolly legs. The tractor is then free to separate from the trailer.

Dump valves are often used on trailers to lower the vehicle frame height during loading conditions. A condition known as trailer creep sometimes occurs as a trailer is loaded adjacent a loading dock. If the height of the trailer is not controlled during loading, the increasing load in the trailer will sometimes cause the trailer tires to rotate about the ground contact point and force the trailer forward. In other words, the trailer tends to "walk" away from the loading dock. This tendency presents obvious problems with strain levels on the trailer dolly legs and access to the trailer from the dock.

Typically, prior art dump valves used to exhaust air from the air springs are separate mechanisms which must be positioned and mounted on the vehicle and separately plumbed into the air lines. The additional labor and hardware costs often exceed the cost of the dump valve itself and increase the time for vehicle assembly.

SUMMARY OF THE INVENTION

The present invention provides a dump valve which connects directly to a height control valve between a source of pressurized air and the height control valve inlet port, avoiding the additional expense of separately mounting the dump valve to the vehicle frame and air lines.

In accordance with the invention, a height control valve comprises an inlet port adapted to communicate with a source of fluid pressure, a discharge port open to atmosphere, and a device port adapted to communicate with a height control member expandable by fluid pressure. A sensing means, adapted for connection to a height control member, senses the height of the height control member. A control means connects to the sensing means, and seals the device port from the inlet port and the discharge port when the sensing means senses a predetermined height. The control means places the device port into communication with the inlet port when the sensing means senses a height less than the predetermined height, and places the device port into communication with the discharge port when the sensing means senses a height greater than the predetermined height.

An improvement to the height control valve comprises a dump valve interposed between the source of fluid pressure and the inlet port. The dump valve comprises a body having a supply port adapted to communicate with a source of fluid pressure, a connection port connected to the inlet port, and an exhaust port open to atmosphere. The dump valve has a supply condition where the exhaust port is sealed from the connection port and the connection port is in communication with the supply port. The dump valve also has an exhaust condition in which the supply port is sealed from the connection port and the connection port is in communication with the exhaust port. Diverting means selectively alternates the dump valve between the supply and exhaust conditions, and when the dump valve is in the exhaust condition, air exhausts from the inlet port of the height control valve through the exhaust port.

Preferably, the diverting means comprises a control bore in the body in fluid communication with the supply port, the exhaust port and the connection port. A sealing member is disposed within the control bore for movement therein between a supply position wherein the exhaust port is sealed and the connection port is in communication with the supply port, and an exhaust position wherein the supply port is sealed and the connection port is in communication with the exhaust port. An actuating means selectively moves the sealing member between the supply and exhaust positions, and movement of the sealing member into the exhaust position will automatically permit fluid to exhaust from the height control valve through the inlet port.

The sealing member preferably comprises a piston disposed in the control bore for reciprocal movement therein, so that the supply position comprises the piston in sealing abutment with an opening of the exhaust port into the control bore, and the exhaust position comprises the piston in sealing abutment with an opening of the supply port into the control bore. The sealing member preferably comprises a tubular body having an insert formed of elastomeric material.

Preferably, the dump valve has an open pilot bore adapted to communicate with a source of fluid pressure. The actuating means comprises a pilot piston disposed within the pilot bore for reciprocal movement therein. A portion of the pilot piston pushes the sealing member, whereby the selective administration of fluid pressure to the open end of the pilot bore moves the pilot piston away from the pilot bore open end and the pilot piston moves the sealing member into the exhaust position.

A biasing means can be provided for biasing the pilot piston towards the open end of the pilot bore. The pilot bore can have an inner end opposite its open end, and an intermediate bore between the inner end of the pilot bore and the control bore. The pilot piston comprises a plunger mounted in the pilot bore, and the portion of the pilot piston pushing the sealing member comprises a shaft extending from the plunger toward the intermediate bore. The selective administration of pressurized air to the open end of the pilot bore moves the shaft of the piston through the intermediate bore to move the sealing member into the exhaust position.

A dump valve, according to the invention, selectively places the inlet port of a height control valve into communication with a source of pressurized air or atmosphere. The dump valve comprises a body having an open supply port adapted to communicate with a source of fluid pressure, a control bore in communication with the supply port, an open exhaust port in communication with the control bore, and a connection port in communication with the control bore. Means in the connection port establish communication between the control bore and the inlet bore of a height control valve. A sealing member is disposed within the control bore for movement therein between a supply position wherein the exhaust port is sealed and the connection port is in communication with the supply port, and an exhaust position wherein the supply port is sealed and the connection port is in communication with the exhaust port. An actuating means selectively moves the sealing member between the supply and exhaust positions, whereby when the connection port is connected to the inlet port of a height control valve, movement of the sealing member into the exhaust position will automatically exhaust fluid from the height control valve.

The means for establishing communication between the control bore and the inlet of a height control valve preferably comprises a tubular adapter, having a central bore therethrough. A first end is adapted to thread into the inlet port of a height control valve, and a second end threads into the connection port of the dump valve.

Alternatively, a dump valve according to the invention selectively places an inlet port of a height control valve into communication with a source of pressurized air or atmosphere. The dump valve comprises a body having a control bore with an open end, an opposing pilot bore with an open end, an intermediate bore connecting the control bore and the pilot bore, and an exhaust bore with an open end. The exhaust bore communicates with the intermediate bore. A connection bore with an open end communicates with the control bore. Means in the connection bore fluidly connect the connection bore to the inlet bore of a height control valve. A supply port communicates with the control bore, and is adapted to receive a connection with a source of pressurized air. A pilot port communicates with the pilot bore, and is adapted to receive a connection with a source of selectively pressurized air. A piston is axially disposed in the pilot bore for reciprocal movement therein between an actuating position and a resting position and is biased toward the resting position. A valve seal is disposed within the control bore for reciprocal movement between a supply position, in which the valve seal abuts the control bore at the intermediate bore to pneumatically seal the control bore from the intermediate bore, and an exhaust position, in which the valve seal abuts the supply port to pneumatically seal the supply port from the control bore. Pressurized air in the supply port biases the valve seal towards the supply position. Selective application of pressurized air to the pilot port moves the piston from the resting position to the actuating position to push the valve seal from the supply position to the exhaust position, thereby putting the connection bore into fluid communication with the exhaust bore.

The piston preferably comprises a plunger mounted in the pilot bore, and a shaft extending outwardly of the pilot bore into the intermediate bore. In the resting position, the shaft is disposed wholly within the pilot bore and the intermediate bore. In the actuating position, the shaft extends through the intermediate bore and into the control bore. A reduced diameter portion can be provided on the piston shaft, whereby when the piston is in the actuating position, the reduced diameter portion extends from within the control bore to the exhaust bore to establish fluid communication through the intermediate bore past the shaft.

Preferably, the control bore further comprises a first annular flange extending axially into the control bore from the supply port, and the exhaust bore further comprises a second annular flange extending axially into the control bore from the intermediate bore. The valve seal is adapted to seat onto the first annular flange in the exhaust position, and onto the second annular flange in the supply position.

BRIEF DESCRIPTION OF THE DRAWINGS

The invention will now be described with reference to the accompanying drawings in which.

DETAILED DESCRIPTION OF THE DRAWINGS

Figure 1:
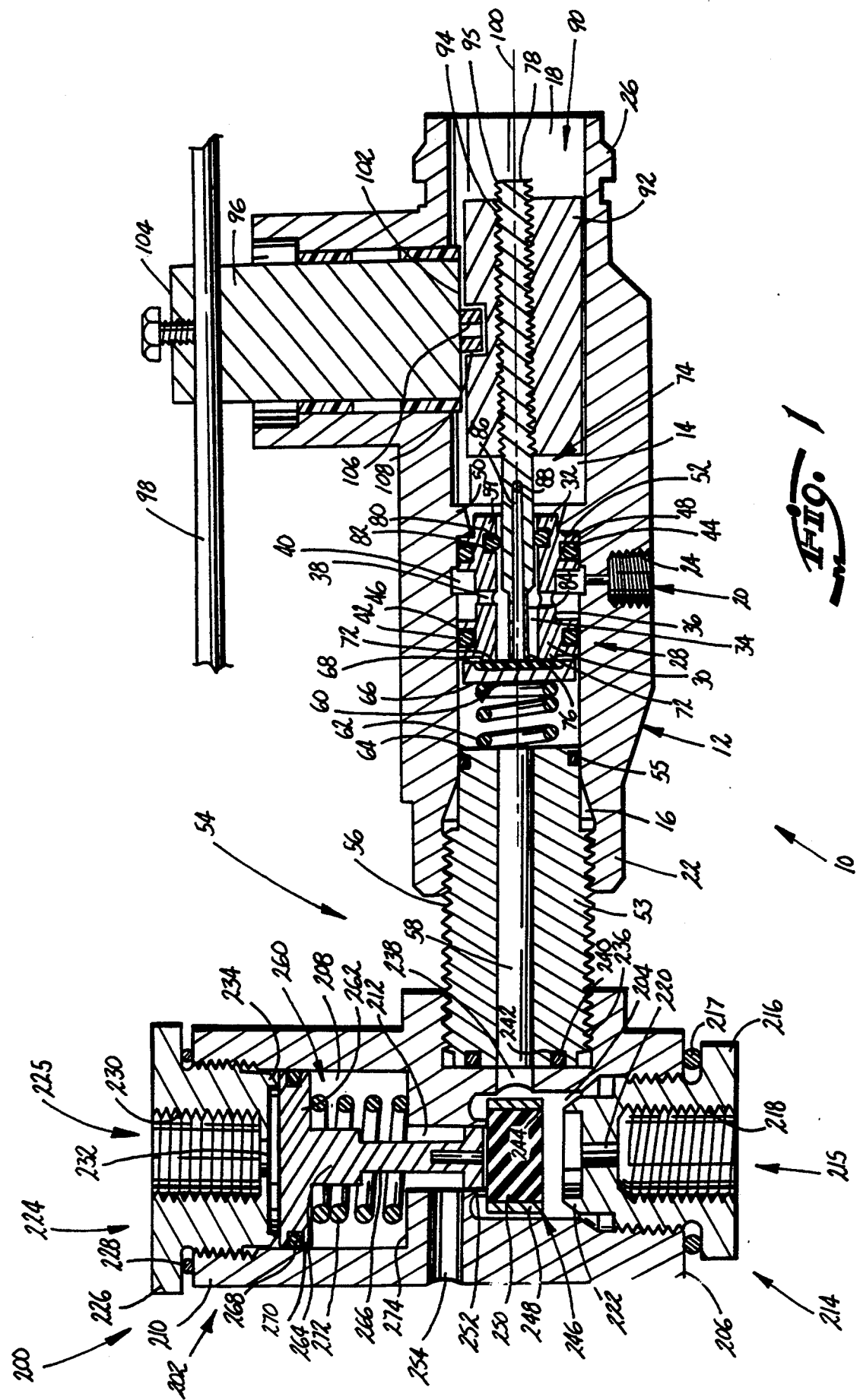
FIG. 1 is an elevational view in section of a height control valve, shown in the neutral position, and a dump valve according to the invention, shown in the supply position.

Referring to the drawings and to FIG. 1 in particular, a typical height control valve assembly 10 adapted to receive a dump valve, according to the invention, comprises generally a valve body 12, having a main bore 14 therethrough, an inlet port 16 at one end of the bore 14, an exhaust port 18 at the opposite end of the bore, and an air spring port 20 radially entering the central bore 14 through a central portion of the valve body 12. Internal threads 22 on the inlet port 16 and internal threads 24 on the air spring port 20 provide for interconnection to the air supply and air spring, respectively (not shown). No threads are provided on the exhaust port 18 as it simply exhausts to atmosphere. However, an annular flange 26 can be provided on the external surface of the valve body 12 adjacent the exhaust port 18 for attaching a muffling device (not shown).

A spool 28, positioned within the bore 14 adjacent the air spring port 20, directs the flow of air to and from the air spring port 20. The spool 28 comprises a first end 30 and a second end 32, a central coaxial bore 34 therethrough, and a deep annular groove 36 about its outer circumference at a point intermediate the first end 30 and second end 32. A plurality of radial passages 38 extends between the annular groove 36 and the central bore 34, placing the central bore 34 into fluid communication with the air spring port 20. To further enhance the fluid communication between the air spring port 20 and central bore 34 of the spool 28, an annular groove 40 about the circumference of the inside surface of the valve body bore 14 at the air spring port 20 provides additional fluid handling capability. The aligned annular grooves 36 and 40 are isolated from the remainder of the valve body bore 14 by means of O-ring seals 42, 44 on the spool 28. A first annular O-ring groove 46 about the outer circumference of the spool 28, adjacent the first end 30, receives the first O-ring seal 42, and a second annular O-ring groove 48 about the outer circumference of the spool 28, adjacent the spool second end 32, receives the second O-ring seal 44. An inwardly directed annular flange 50 on the valve body bore 14 is in confronting relationship to an annular shoulder 52, formed on the second end 32 of the spool 28 to restrain axial movement of the spool 28 toward the exhaust port 18. A reduced diameter portion 59 of the spool is thus coaxially received within the annular flange 50.

A first end 53 of a valve body interadapter 54, having a threaded outer surface 56 and a coaxial central bore 58 therethrough, is threaded into the supply port 16. An O-ring seal 55, on the outer circumference of a portion of the interadapter 54, interior of the inlet port 16, seals against the valve body 12. An air seal 60 is biased against the first end 30 of the spool 28 by means of a spring 62 operating between an end face 64 of the interadapter 54 and the air seal 60. The air seal 60 has a circular discoid shape and comprises a first flat face 66, which engages the spring 62, and an opposite face 68, having a resilient rubber insert 70 therein. The rubber insert 70 engages an annular lip 72 which extends outward axially from the first end 30 of the spool 28, and encircles the entrance to the central bore 34 to seal the inlet port 16 from the central bore 34 of the spool 28.

Flow of air through the height control valve is controlled by an exhaust pin 74. The exhaust pin 74 comprises a distal end 76 and a proximal end 78. The outside diameter of the exhaust pin 74 is slightly less than the diameter of the central bore 34 such that the exhaust pin 74 is received within the central bore 34 of the spool 28 with a relatively close tolerance therebetween. A packing 80 fits within an annular groove 82 on the inside surface of the spool central bore 34, adjacent the spool second end 32 to pneumatically seal the exhaust pin 74 within the central bore 34. The distal end 76 of the exhaust pin 74 has a reduced external diameter portion 84 to form an annular air passage adjacent to the axial passageways 38 leading to the annular grooves 36 and 40. A central coaxial bore 86 extends from the distal tip 76 of the exhaust pin 74 to at least one radial passageway 88 extending radially from the central bore 86 of the exhaust pin 74 outwardly to the exterior surface thereof. The radial passageway 88 exits the exhaust pin 74 proximal of the spool 28, communicating the central bore 86 of the exhaust pin 74 with the valve body central bore 14 and thus with the exhaust port 18 and atmosphere.

Movement of the exhaust pin 74 is controlled by a slide 90. The slide 90 comprises a circular body with a flat side 92 having a threaded coaxial bore 94 therethrough. A threaded portion 95 of the exhaust pin 74 near its proximal end 78 is threaded into the threaded central bore 94 of the slide 90. Thus, axial movement of the slide 90 causes corresponding axial movement of the exhaust pin 74. A main shaft 96 extends radially into the valve body central bore 14 adjacent the slide 90. A control arm 98 extends outwardly radially from the main shaft 96 and is connected to a linkage (not shown) which senses the spacing distance which the height control valve 10 is installed to control. For instance, in a semi-trailer suspension (not shown) the radial angle of the control arm 98 relative to the central axis 100 of the valve body central bore 14 would vary in response to the distance between the trailer frame (not shown) and axle (also not shown).

The main shaft 96 has an inward end 102 and an outward end 104. A pin 106 is eccentrically mounted to and extends axially from the inward end 102 of the main shaft 96, so that angular rotation of the main shaft 96 axially displaces the pin 106 within the valve body central bore 14. The pin 106 is received within a groove 108 in the flat outer surface of the slide 90, so that axial displacement of the pin 106 correspondingly axially displaces the slide 90 within the valve body central bore 14.

Figure 2:
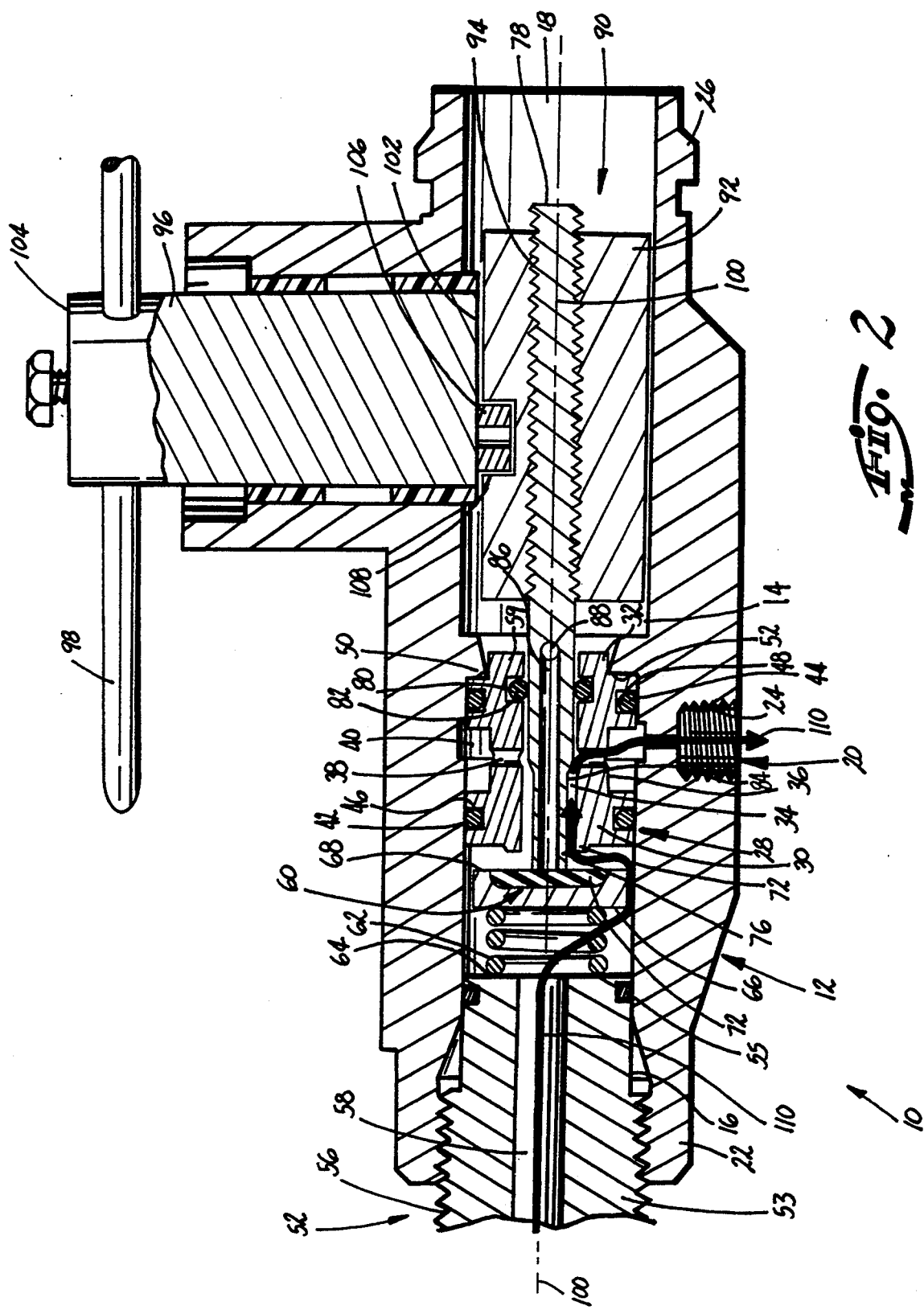
FIG. 2 is a sectional view of the height control valve of FIG. 1 shown in the intake position.

FIG. 1 shows the height control valve 10 in the neutral position wherein air neither enters nor exits the air spring (not shown) through the air spring port 20. Turning to FIG. 2, the control arm 98 and the main shaft 96 are then rotated due to a decrease in the controlled height and the slide 90 is moved toward the spool 28, thereby moving the exhaust pin 74 axially toward the air seal 60 so that the exhaust pin distal end 76 moves the air seal 60 away from the spool 28. Pressurized air can then flow from the inlet port 16 to the air spring port 20 following an inflow path 110, comprising pressurized air flowing into the valve bore 14 through the inlet port 16, past the air seal 60, into the spool central bore 34, out of the spool 28, through the axial passageways 38, into the annular grooves 36, 40, and out through the air spring port 20, and into the air spring (not shown). As the air spring fills or as the height is otherwise changed, the main shaft 96 rotates back into the neutral position, as shown in FIG. 1, thereby preventing further in-flow of air into the air spring (not shown).

Figure 3:
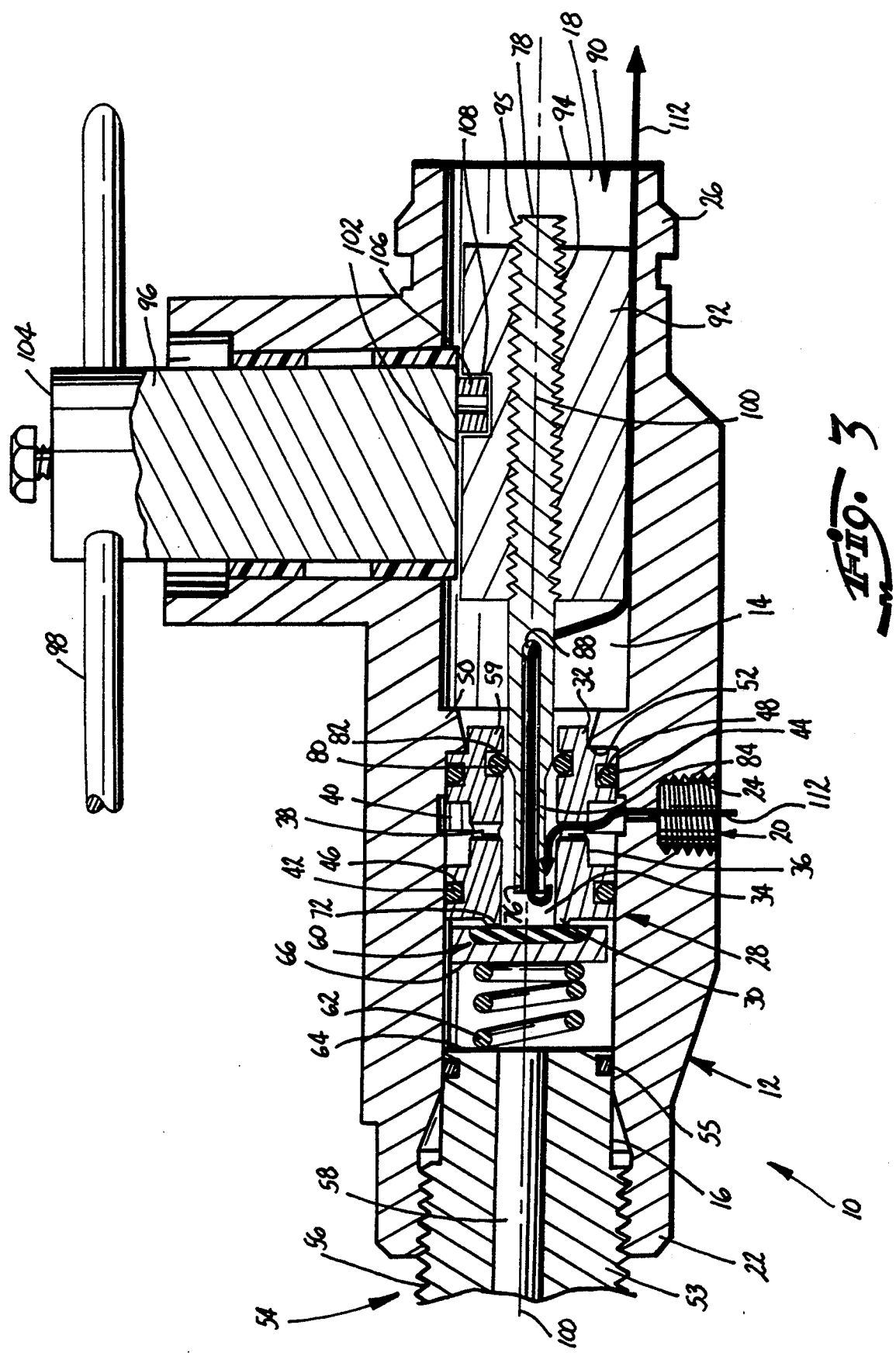
FIG. 3 is a sectional view of the height control valve of FIG. 1 shown in the exhaust position.

Conversely, as shown in FIG. 3, when the controlled height exceeds the design parameter, the control arm 98 rotates the main shaft 96 in the opposite direction, moving the slide 90 axially away from the spool 28. The distal end 76 of the exhaust pin 74 disengages from the rubber first adapter 70 of the air seal 60, allowing air to flow from the air spring (not shown) past the distal end 76 of the exhaust pin 74 and through the exhaust pin central bore 86 and the radial passageway 88, to the central bore 14, and ultimately to the atmosphere through the exhaust port 18, comprising an outflow path 112.

Figure 4:
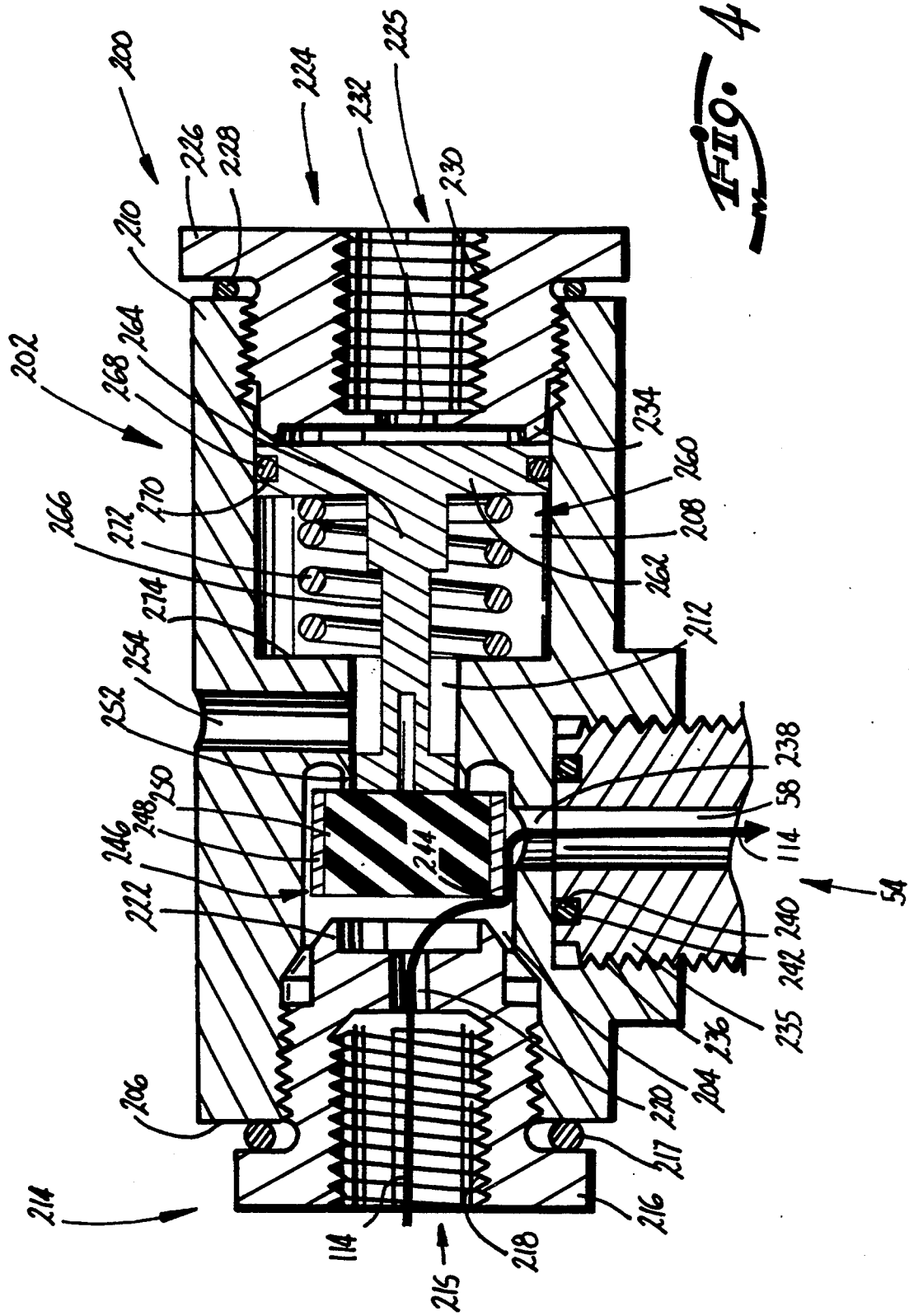
FIG. 4 is a sectional view of the dump valve of FIG. 1 shown in the supply position.

The height control valve 10 of FIGS. 1 to 3 is available from the Neway division of Neway Anchorlok International, as part No. 905-54-249. A dump valve 200, according to the invention, is illustrated in FIGS. 4. and 5 and controls the dumping of air from the air spring (not shown) through the height control valve 10. The height control valve 10 is merely shown by way of illustration; the dump valve 200 may be used with many designs of height control valves.

Turning to FIG. 4, the dump valve 200 is connected between the air supply (not shown) and the height control valve 10 (see FIGS. 1-3). The dump valve 200 comprises a body 202 having a control bore 204 entering from a first end 206 and a pilot bore 208 entering from an opposite second end 210. The pilot bore 208 and control bore 204 are axially aligned and interconnected by a narrower diameter intermediate bore 212. The control bore 204 is threaded internally and receives a threaded first adapter 214 forming a supply port 215. The first adapter 214 comprises an annular flange 216 extending outwardly radially which compresses an O-ring seal 217 against the valve body first end 206. A threaded connection bore 218 extends coaxially into the first adapter 214 from its outer end to connect to the air supply lines (not shown). A central supply aperture 220 through the remaining length of the first adapter 214 establishes fluid communication between the control bore 204 and the connection bore 218. The inward end of the first adapter 214 has an annular lip 222 extending axially inwardly into the control bore 204 and encircles the exit of the central supply bore 220.

A second adapter 224, comprising an annular flange 226, O-ring seal 228, connection bore 230, central supply bore 232, and axially inwardly extending lip 234, is threadably received within the pilot bore 208, forming a pilot port 225.

A second end 235 of the interadapter 54, whose first end 53 is connected to the height control valve 10 (see FIGS. 1 to 3), is threaded into an interconnection port 236 which extends inwardly radially of the valve body 202 towards the control bore 204 intermediate the first adapter 214 and the second adapter 224. A narrower aperture 238 extends between the innermost portion of the interconnection bore 236 and the control bore 204. An O-ring 240 is received within an annular axial groove 242 on the second end face 244 of the interadapter 54 to seal the interconnection between the interadapter 54 and the interconnection bore 236. The interadapter central bore 58 is thus aligned with and in communication with the control bore 204 through the interconnection bore aperture 238, and with the height control valve 10 inlet port 16 (FIGS. 1-3).

A discoid shaped air seal 246 operates within the control bore 204 and comprises a tubular metal body 248 and a rubber inner core 250. The intermediate bore 212 extends into the larger diameter control bore 204 and has an annular axial lip 252 surrounding its entrance to the control bore 204 and extending axially therein a short distance. The lip 252 normally engages the rubber core 250 of the air seal 246 to seal the intermediate bore 212 from the control bore 204.

An exhaust port 254 extends radially outwardly from the intermediate bore 212 to the exterior of the valve body 202, establishing direct fluid communication between the intermediate bore 212 and the atmosphere. The air seal 246 is thus held firmly against the lip 252 by the pressure differential between the high pressure air at the inlet 218 and the atmospheric pressure in the intermediate bore 212. Operation of the air seal 246 will be more fully explained hereinafter.

A pilot piston 260 operates within the pilot bore 208. The pilot piston 260 comprises a plunger 262 at one end, and a shaft 264 extending axially therefrom into the intermediate bore 212. A central portion of the shaft 264 has a reduced diameter 266. The outward radial edge of the plunger 262 has a dynamic seal 268 which pneumatically seals the plunger 262 to the surface of the pilot bore 208. Preferably, the plunger seal 268 is fitted within an annular groove 270 on the radial outward edge of the plunger 262. A return spring 272 operates between a distal end 274 of the pilot bore 208 and the plunger 262 to bias the pilot piston 260 towards the second adapter 224. The return spring 272 preferably comprises a coiled compression spring.

In operation, the exhaust port 254 and pilot port 225 are at atmospheric pressure while the supply port 215 is at an elevated pressure of the vehicle air system, typically 90 PSIG or more. Thus, the pressure differential across the air seal 246 tends to force the air seal 246 onto the intermediate bore lip 252. This condition is shown in FIG. 4. With the dump valve 200 in this state, the height control valve 10 operates as previously described with the pressurized air of the supply flowing from the supply port 215, through the central supply bore 220, to the control bore 204, and into the interconnection bore aperture 238 and the interadapter central bore 58, comprising a supply path 14.

Figure 5:
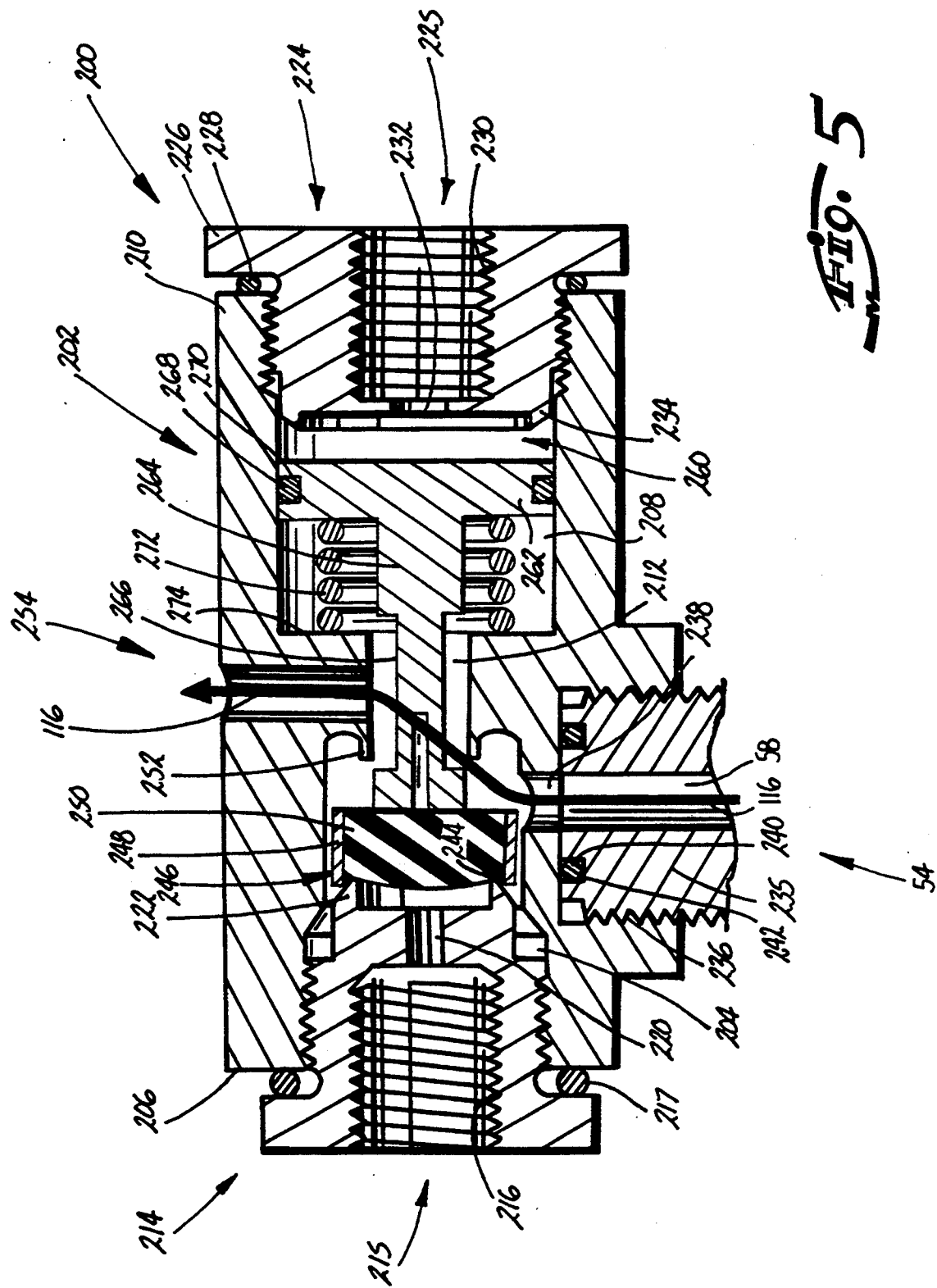
FIG. 5 is a sectional view of the dump valve of FIG. 1 shown in the exhaust position.

When the operator wishes to dump the air out of the air spring (not shown), air pressure is applied to the pilot port 225. The pilot piston plunger 262 has a larger diameter than the air seal 246. Consequently, equal air pressure applied to the pilot port 230 and air supply port 218 generates a greater force against the larger diameter plunger 262, tending to move the pilot piston 260 into contact with the air seal 246 and forcing the air seal 246 against the first adapter lip 222. Thus, the air seal 246 seals the control bore 204 from the supply port 218, preventing pressurized air from entering the height control valve 10 through the interadapter central bore 58. This state of the dump valve 200 is illustrated in FIG. 5.

Figure 6:
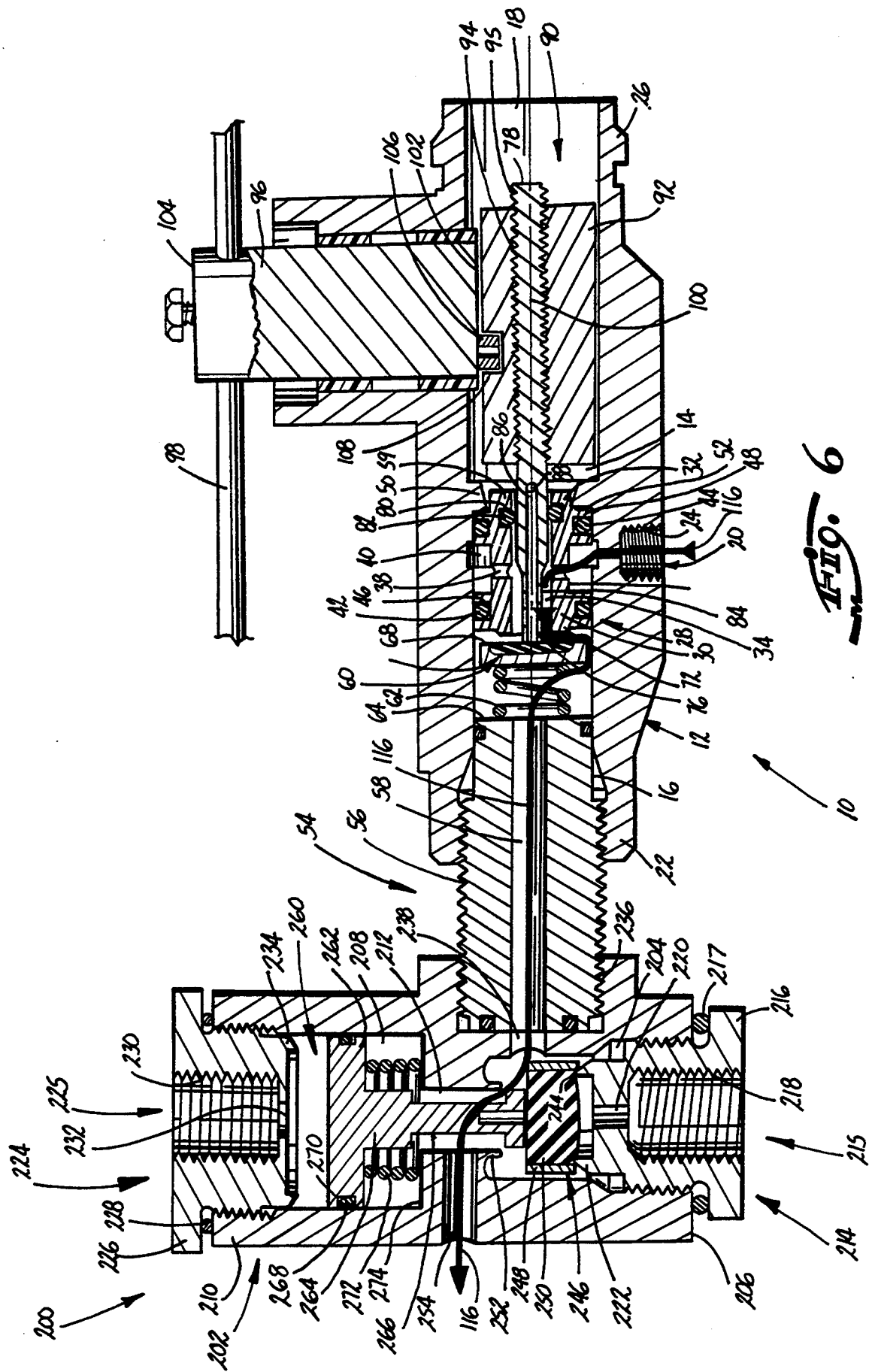
FIG. 6 is a sectional view of the height control valve and dump valve of FIG. 1 shown in the exhaust position.

The reduced diameter portion 266 of the pilot piston shaft 264 extends into the control bore 204 past the lip 252. The central bore 58 of the interadapter 54 is thus in fluid communication with the exhaust port 254 through the intermediate bore 212. Turning to FIG. 6, removal of pressurized air from the inlet port 16 of the height control valve 10 will cause the pressurized air inside the air spring (not shown) to flow out of the height control valve 10 through the inlet port 16 and ultimately to atmosphere through the exhaust port 254, comprising an exhaust flow path 116. This occurs because the pressure inside the air spring port 20 exceeds the pressure in the supply port 16, causing the air seal 60 to move away from the lip 72 on the spool 28. The air seal spring 62 has a low spring constant, sufficient to resist only a few PSI differential across the air seal 60. As air flows out of the air spring (not shown), the central height decreases so that the control arm 98 will rotate, thereby causing the exhaust pin 74 to move inwardly and further push the air seal 60 away from the spool 28. Normally this action would be accompanied by an in-rush of air from the air supply (not shown) to refill the air spring (not shown); however, with the dump valve 200 blocking access to the air supply (not shown), air continues to flow out through the height control valve 10 and dump valve 200.

Interposing the dump valve 200 between the air supply and the inlet port 16 of the height control valve 10 reduces the complexity and expense of the dump valve arrangement versus prior dump valves. It allows the mechanism of the height control valve 10 to assist in the dumping function. Otherwise the height control valve 10 must be isolated in some fashion so that it does not supply air to the air spring, as the air spring height decreases during dumping. Attaching the dump valve 200 directly to the height control valve 10, or forming the two as an integral unit, reduces the expense of separately mounting the dump valve 200 to the vehicle frame and plumbing it into the vehicle air system.

Reasonable variation and modification are possible within the scope of the foregoing disclosure and drawings without departing from the spirit of the invention, as defined in the accompanying claims. For example, it will be understood that alternative means for driving the pilot piston 260 toward and away from the second adapter are within the scope of the invention. The piston can be driven mechanically, electrically or hydraulically with equivalent effect on the operation of the dump valve 200. The invention is not limited to the pilot piston 260 for controlling axial movement of the air seal 246, any suitable mechanical, electrical or fluid operated means may be substituted therefor. Also, other means may be substituted for the air seal 246, which would allow the interconnection bore 236 to alternately communicate with the supply port 215 or exhaust port 254. Of course, the height control valve 10 and dump valve 200 could be cast as a single unit.

The embodiments of the invention in which an exclusive property or privilege is claimed are as follows:

1. In a height control valve comprising:
an inlet port adapted to communicate with a source of fluid pressure;
a discharge port open to atmosphere;
a device port adapted to communicate with a height control member expandable by fluid pressure;
sensing means adapted for connection to a height control member for sensing the height thereof; and
control means connected to the sensing means for sealing the device port from the inlet port and the discharge port when the sensing means senses a predetermined height, for placing the device port into communication with the inlet port when the sensing means senses a height less than the predetermined height, and for placing the device port into communication with the discharge port when the sensing means senses a height greater than the predetermined height;
the improvement comprising a dump valve interposed between the source of fluid pressure and the inlet port and in communication with the inlet port, the dump valve comprising:
a body having a supply port adapted to communicate with a source of fluid pressure, a connection port in communication with the inlet port, and an exhaust port open to atmosphere;
the dump valve having a supply condition wherein the exhaust port is sealed from the connection port and the connection port is in communication with the supply port, and an exhaust condition wherein the supply port is sealed from the connection port and the connection port is in communication with the exhaust port; and
diverting means in the valve body for selectively alternating the dump valve between the supply and exhaust conditions, whereby when the dump valve is in the exhaust position, air exhausts from the inlet port of the height control valve through the exhaust port.

2. A height control valve according to claim 1 wherein the diverting means comprises:
the body having a control bore in fluid communication with the supply port, the exhaust port and the connection port;
a sealing member disposed within the control bore for movement therein between a supply position wherein the exhaust port is sealed and the connection port is in communication with the supply port, and an exhaust position wherein the supply port is sealed and the connection port is in communication with the exhaust port; and
actuating means for selectively moving the sealing member between the supply and exhaust positions, whereby movement of the sealing member into the exhaust position will automatically permit fluid to exhaust from the height control valve through the inlet port.

3. A height control valve according to claim 2 wherein the sealing member comprises a piston disposed in the control bore for reciprocal movement therein, and wherein the supply position comprises the piston in sealing abutment with an opening of the exhaust port into the control bore, and the exhaust position comprises the piston in sealing abutment with an opening of the exhaust bore into the control bore.

4. A height control valve according to claim 3 wherein the sealing member further comprises a tubular body having an insert formed of elastomeric material.

5. A height control valve according to claim 2 and further comprising a pilot bore having an open end adapted to communicate with a source of fluid pressure; and wherein the actuating means comprises a pilot piston disposed within the pilot bore for reciprocal movement therein, and a portion of the pilot piston being positioned to move the sealing member, whereby the selective administration of fluid pressure to the open end of the pilot bore urges the pilot piston away from the pilot bore open end thereby urging the sealing member into the exhaust position.

6. A height control valve according to claim 5 and further comprising a biasing means for biasing the pilot piston towards the open end of the pilot bore.

7. A height control valve according to claim 5 and further comprising a pilot bore inner end opposite the open end of the pilot bore in communication with the control bore, and wherein the pilot piston comprises a plunger and a shaft extending from the plunger toward the control bore and the sealing member, whereby the selective administration of pressurized air to the open end of the pilot bore urges the shaft of the piston toward the sealing member into contact with the sealing member and thereby to urge it into the exhaust position.

8. A dump valve for selectively placing the inlet port of a height control valve into communication with a source of pressurized air or atmosphere, the dump valve comprising:

a body having an open supply port adapted to communicate with a source of fluid pressure, a control bore in communication with the supply port, an open exhaust port in communication with the control bore, and a connection port in communication with the control bore;

means for establishing communication between the connecting port and the inlet bore of a height control valve;

a sealing member having an insert formed of elastomeric material, said sealing member being disposed within the control bore for reciprocal movement therein between a supply position wherein the exhaust port is sealed by the insert and the connection port is in communication with the supply port, and an exhaust position wherein the supply port is sealed by the insert and the connection port is in communication with the exhaust port; and actuating means for selectively moving the sealing member between the supply and exhaust positions, whereby when the connection port is in communication with the inlet port of a height control valve, movement of the sealing member into the exhaust position will automatically exhaust fluid from the height control valve.

9. A dump valve according to claim 8 and further comprising a pilot bore having an open end adapted to communicate with a source of fluid pressure; and wherein the actuating means comprises a pilot piston disposed within the pilot bore for reciprocal movement therein, and a portion of the pilot piston being positioned to move the sealing member, whereby the selective administration of fluid pressure to the open end of the pilot bore urges the pilot piston away from the pilot bore open end and hereby urging the sealing member into the exhaust position.

10. A dump valve according to claim 9 and further comprising a biasing means for biasing the pilot piston towards the open end of the pilot bore.

11. A dump valve according to claim 9 and further comprising a pilot bore inner end opposite the open end of the pilot bore in communication with the control bore, and wherein the pilot piston comprises a plunger and a shaft extending from the plunger toward the control bore and the sealing member, whereby the selective administration of pressurized air to the open end of the pilot bore urges the shaft of the piston toward the sealing member into contact with the sealing member and thereby to urge it into the exhaust position.

12. A dump valve according to claim 8 wherein the means for establishing communication between the connection port and the inlet of a height control valve comprises a tubular adapter, having a central bore therethrough, a first end adapted to thread into the inlet port of a height control valve, and a second end threaded into the connection port of the dump valve.

13. A dump valve for selectively placing an inlet port of a height control valve into communication with a source of pressurized air or atmosphere, the dump valve comprising:

a body having a control bore with an open end, an opposing pilot bore with an open end, an intermediate bore connecting the control bore and the pilot bore, an exhaust bore with an open end and, the exhaust bore in being communication with the intermediate bore, and a connection bore with an open end, the connection bore being in communication with the control bore;

means in the connection bore for fluidly connecting the connection bore to the inlet bore of a height control valve;

a supply port in communication with the control bore, the supply port being adapted to receive a connection with a source of pressurized air;

a pilot port in communication with the pilot bore, the pilot port being adapted to receive a connection with a source of selectively pressurized air;

a piston axially disposed in the pilot bore for reciprocal movement therein between an actuating position and a resting position, and the piston being biased toward the resting position;

a valve seal disposed within the control bore for reciprocal movement between a supply position wherein the valve seal abuts the control bore at the intermediate bore to pneumatically seal the control bore from the intermediate bore, and an exhaust position, wherein the valve seal abuts the supply port to pneumatically seal the supply port from the control bore; and whereby pressurized air in the supply port biases the valve seal towards the supply position, and wherein the selective application of pressurized air to the pilot port moves the piston from the resting position to the actuating position to push the valve seal from the supply position to the exhaust position, thereby putting the connection bore into fluid communication with the exhaust bore.

14. A dump valve assembly according to claim 13 wherein the piston comprises a plunger mounted in the pilot bore and a shaft extending outwardly of the pilot bore into the intermediate bore.

15. A dump valve assembly according to claim 14 wherein, the resting position comprises the shaft being disposed wholly within the pilot bore and the intermediate bore, and the actuating position comprises the shaft extending through the intermediate bore and into the control bore.

16. A dump valve assembly according to claim 15 and further comprising a reduced diameter portion on the piston shaft, whereby when the piston is in the actuating position, the reduced diameter portion extends from within the control bore to the exhaust bore to establish fluid communication through the intermediate bore past the shaft.

17. A dump valve assembly according to claim 13 and wherein the control bore further comprises a first annular flange extending axially into the control bore from the supply port, and the exhaust bore further comprises a second annular flange extending axially into the control bore from the intermediate bore, and the valve seal is adapted to seat onto the first annular flange in the exhaust position, and onto the second annular flange in the supply position.

* * * * *